United States Patent
Clampitt, III et al.

(10) Patent No.: US 11,225,334 B2
(45) Date of Patent: Jan. 18, 2022

(54) SYSTEMS AND METHODS FOR MONITORING THE HEALTH OF A ROTATING MACHINE

(71) Applicant: Honeywell international inc., Morris Plains, NJ (US)

(72) Inventors: Norman Cornelius Clampitt, III, Long Beach, CA (US); Mohit Singhai, Chandler, AZ (US); Thomas Mark MacRunnel, Lomita, CA (US); Aerwin Perez, Azusa, CA (US)

(73) Assignee: Honeywell International Inc., Charlotte, NC (US)

( * ) Notice: Subject to any disclaimer, the term of this patent is extended or adjusted under 35 U.S.C. 154(b) by 20 days.

(21) Appl. No.: 16/375,080

(22) Filed: Apr. 4, 2019

(65) Prior Publication Data
US 2020/0317366 A1    Oct. 8, 2020

(51) Int. Cl.
*B64D 45/00*    (2006.01)
*G07C 5/08*    (2006.01)

(52) U.S. Cl.
CPC ........... *B64D 45/00* (2013.01); *G07C 5/0808* (2013.01); *B64D 2045/0085* (2013.01)

(58) Field of Classification Search
None
See application file for complete search history.

(56) References Cited

U.S. PATENT DOCUMENTS

| | | | |
|---|---|---|---|
| 9,090,339 | B2 | 7/2015 | Arms et al. |
| 9,539,866 | B2 | 1/2017 | Mouchet |
| 9,944,404 | B1 * | 4/2018 | Gentry .................. G01M 17/00 |
| 2016/0003708 | A1 | 1/2016 | D'Orlando et al. |
| 2016/0055685 | A1 * | 2/2016 | Lilly .................... G07C 5/0808 701/1 |

(Continued)

FOREIGN PATENT DOCUMENTS

WO    2017/222848 A1    12/2017

OTHER PUBLICATIONS

Prateek Saxena et at, "Fault Diagnostics and Health Monitoring of Machines Using Wireless Condition Monitoring Systems", International Journal of Scientific & Engineering Research, vol. 6, Issue 4, Apr. 2015, pp. 178-182.

(Continued)

*Primary Examiner* — Tamara L Weber
(74) *Attorney, Agent, or Firm* — Bookoff McAndrews, PLLC

(57) ABSTRACT

Systems and methods for monitoring the health of a rotating machine mounted on a vehicle are disclosed. The method may include: receiving identifying information of the vehicle, the rotating machine, and a vibration sensor coupled to the rotating machine; receiving vibration data from the vibration sensor during operation of the rotating machine, the received vibration data being associated with the identifying information of the vehicle, the rotating machine, and the vibration sensor; comparing the received vibration data with known vibration data for the rotating machine; generating an alert if the received vibration data exceeds a predetermined threshold value of the known vibration data; generating a health report for the rotating machine based on the received vibration data; and transmitting the health report to a user via a web portal.

20 Claims, 6 Drawing Sheets

(56) References Cited

U.S. PATENT DOCUMENTS

2017/0015151 A1    1/2017  Bill
2017/0178030 A1    6/2017  Pal
2018/0052068 A1    2/2018  Nicks et al.
2018/0284735 A1*  10/2018  Celia .................... G06N 3/0472
2018/0350165 A1*  12/2018  Moravek ................. B64F 5/60

OTHER PUBLICATIONS

Fred M. Discenzo et al., "Intelligent Sensor Modes Enable a New Generation of Machinery Diagnostics and Prognostics", Defense Technical Information Center Compilation Part Notice, ADP013512, 2001, pp. 405-414 (11 pp.).

* cited by examiner

CONNECTED VACUUM BLOWER WEB

VEHICLE 1   VEHICLE 2   VEHICLE 3

BACK TO INDEX

VEHICLE 3

STATUS ∨    SEARCH 🔍

| LAST DATA | TAIL NO. | SENSOR ID | LEFT VACUUM BLOWER | RIGHT VACUUM BLOWER | ACTIONS |
|---|---|---|---|---|---|
| 4:55pm 05/21/18 | 1234 | Sensor1a | ● 1.8g | ○ 1.9g | VIEW FULL REPORT |
| 5:21pm 05/21/18 | 5678 | Sensor2b | ○ 2.1g | ○ 2.0g | VIEW FULL REPORT |
| 2:15pm 05/21/18 | 4321 | Sensor3a | ○ 1.6g | ○ 1.7g | VIEW FULL REPORT |
| 6:01pm 05/21/18 | 8765 | Sensor4b | ○ 2.0g | ○ 2.2g | VIEW FULL REPORT |

HOME

FIG. 4A

SYSTEMS AND METHODS FOR MONITORING THE HEALTH OF A ROTATING MACHINE

TECHNICAL FIELD

Various embodiments of the present disclosure generally relate to sensing and managing rotating machines and, more particularly, to systems and methods for monitoring the health of a rotating machine mounted on a vehicle.

BACKGROUND

Rotating machines are used in a variety of industrial and transportation applications. Rotating machines may be machines that including rotating members and are relied upon for numerous functions including drive shafts, fans, belt drives, pumps, rotors, etc. Because rotating machines often involve high service lives, heavy hourly usage, heavy loads, and/or fast rotational speeds, rotating machines can fail without warning.

In a vehicular or aviation environment, components (e.g., rotating members) can fail within rotating machines mounted on those vehicles, such as within a vacuum blower for the waste system of a commercial aircraft. For example, foreign objects may enter and damage the vacuum blower such that minor leaks may occur in the waste system. Minor leaks may go unnoticed by aircraft maintenance personnel until the leaks cause failure of the waste system. When the waste system fails due to leaks or other causes, the vacuum blower may need to be removed for maintenance and/or replacement. Unscheduled removal of the vacuum blower may cause expensive business interruptions such as delays and cancellations of flights.

The present disclosure is directed to overcoming one or more of these above-referenced challenges.

SUMMARY OF THE DISCLOSURE

According to certain aspects of the disclosure, systems and methods are disclosed for monitoring the health of a rotating machine.

In aspect, a computer-implemented method for monitoring the health of a rotating machine mounted on a vehicle is disclosed. The method may include: receiving, by a processor, identifying information of the vehicle, the rotating machine, and a vibration sensor coupled to the rotating machine; receiving, by the processor, vibration data from the vibration sensor during operation of the rotating machine, the received vibration data being associated with the identifying information of the vehicle, the rotating machine, and the vibration sensor; comparing, by the processor, the received vibration data with known vibration data for the rotating machine; generating, by the processor, an alert if the received vibration data exceeds a predetermined threshold value of the known vibration data; generating, by the processor, a health report for the rotating machine based on the received vibration data, the health report including the received vibration data associated with the identifying information of the vehicle, the rotating machine, and the vibration sensor, wherein the health report further includes the generated alert; and transmitting, by the processor, the health report to a user via a web portal.

In another aspect, a system for monitoring the health of a rotating machine mounted on a vehicle is disclosed. The system may include: a memory having processor-readable instructions therein; and at least one processor configured to access the memory and execute the processor-readable instructions, which when executed by the processor configures the processor to perform a plurality of functions, including functions for: receiving, by the processor, identifying information of the vehicle, the rotating machine, and a vibration sensor coupled to the rotating machine; receiving, by the processor, vibration data from the vibration sensor during operation of the rotating machine, the received vibration data being associated with the identifying information of the vehicle, the rotating machine, and the vibration sensor; comparing, by the processor, the received vibration data with known vibration data for the rotating machine; generating, by the processor, an alert if the received vibration data exceeds a predetermined threshold value of the known vibration data; generating, by the processor, a health report for the rotating machine based on the received vibration data, the health report including the received vibration data associated with the identifying information of the vehicle, the rotating machine, and the vibration sensor, wherein the health report further includes the generated alert; and transmitting, by the processor, the health report to a user via a web portal.

In yet another aspect, a non-transitory computer-readable medium containing instructions for monitoring the health of a rotating machine mounted on a vehicle is disclosed. The instructions may include: receiving, by a processor, identifying information of the vehicle, the rotating machine, and a vibration sensor coupled to the rotating machine; receiving, by the processor, vibration data from the vibration sensor during operation of the rotating machine, the received vibration data being associated with the identifying information of the vehicle, the rotating machine, and the vibration sensor; comparing, by the processor, the received vibration data with known vibration data for the rotating machine; generating, by the processor, an alert if the received vibration data exceeds a predetermined threshold value of the known vibration data; generating, by the processor, a health report for the rotating machine based on the received vibration data, the health report including the received vibration data associated with the identifying information of the vehicle, the rotating machine, and the vibration sensor, wherein the health report further includes the generated alert; and transmitting, by the processor, the health report to a user via a web portal.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIGS. 4A and 4B depict an exemplary web portal for displaying a health report of the rotating machine of the system of FIG. 1.

DETAILED DESCRIPTION

Figure 1:
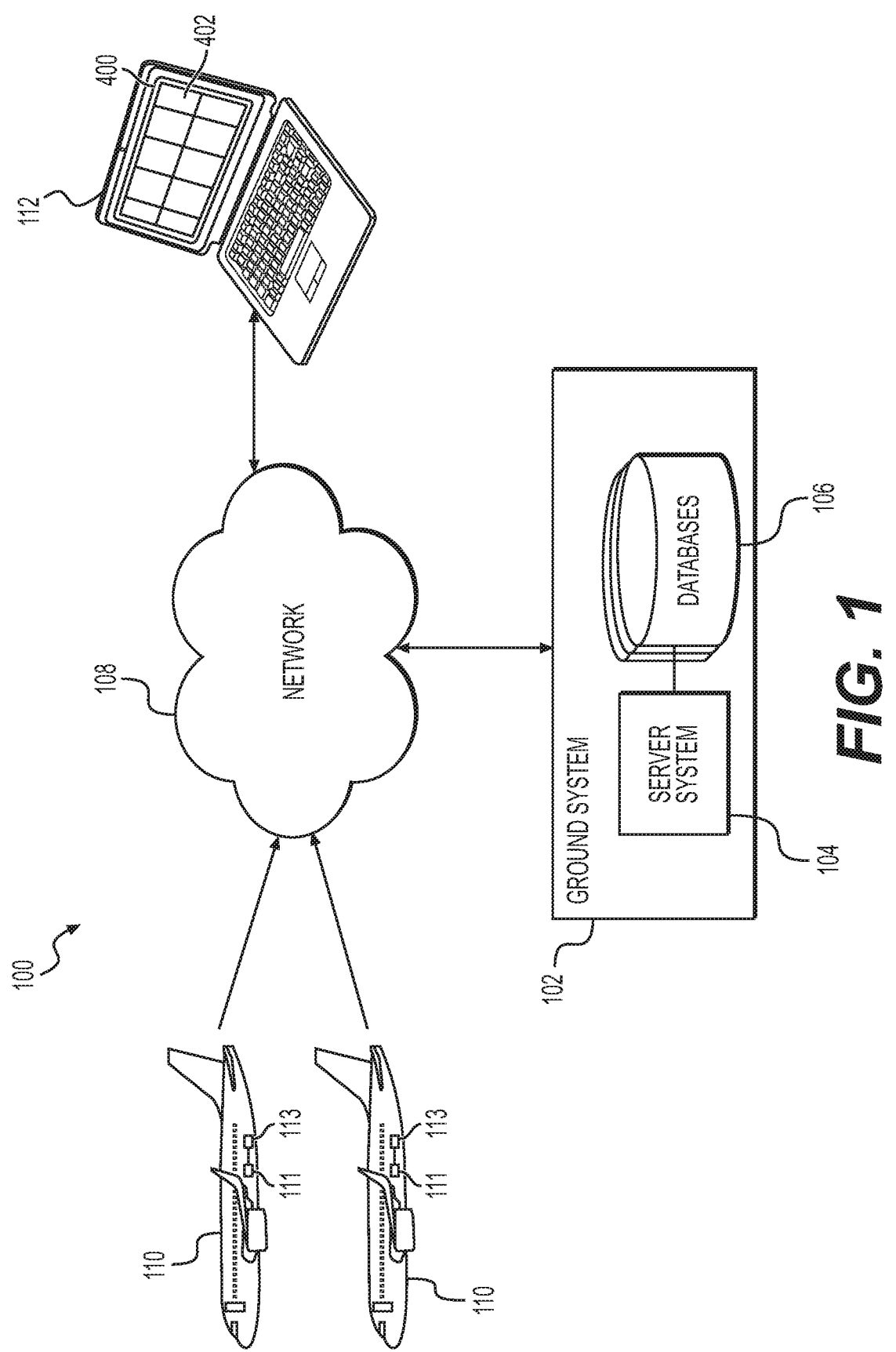
FIG. 1 depicts a block diagram of a system for monitoring the health of a rotating machine mounted on a vehicle, according to one or more embodiments.

The following embodiments describe systems and methods for monitoring the health of a rotating machine mounted on or part of any type of industrial system or machine, such as a vehicle. As used herein, a "rotating machine" may include any type of machine having at least one rotating member. A "rotating machine" may further include the rotating member of the rotating machine such as, for example, fans, blowers, belt drives, or the like. As described above, there is a need to detect when a rotating member or rotating machine (e.g., a vacuum blower) on a vehicle is likely to fail prior to the machine failing, to avoid costly delays and cancellations. In general, the present disclosure is directed to generating and providing a health report of a rotating machine (e.g., a machine having a rotating member) in a vehicle. Embodiments of the present disclosure provide for a wireless vibration sensor and/or a temperature sensor mounted on the rotating machine to measure vibrations and/or temperature of the rotating machine. Power to the sensor and wireless transmitter may come from the input power of the machine. Vibration data and/or temperature data may be transmitted wirelessly to receivers onboard the vehicle, which may collect and retransmit the data to a system capable of storing, analyzing, summarizing, and presenting the data to consumers of the data, such as vehicle operators and/or a manufacturer of the machine.

The vibration sensor may utilize a vibration signature of the rotating machine to measure the health of the rotating machine. The system may provide an alert (via email and/or web portal) when the measured vibration signature exceeds an operational threshold of the rotating machine. The data may be automatically and securely uploaded to a cloud-based platform where analytics may be executed to generate the health reports. In some embodiments, the vibration sensor may record the vibration signature when the rotating machine is run and automatically send data of the vibration signature to the cloud-based platform. The above steps may be performed for each test on a plurality of rotating machines.

The rotating machine analytics of the data may be accessed via a secured web portal. For example, a landing page of the web portal may display drill-down dashboards for each vehicle (e.g., a fleet of aircraft). Detailed and accurate health reports may be generated and available for each machine. Maintenance technicians may view the health report and order the rotating machine or component to be replaced within a certain number of days before it causes disruption.

While the present embodiments are described in relation to a vacuum pump, for example, it should be appreciated that the present embodiments are relevant to the detection of vibrations in any rotating machine, such as a drive shaft, turbine, pump, impeller, motor, fan, rotor, or any other vibrating body. Moreover, while the present embodiments are described in relation to a rotating machine on an aircraft, it should be appreciated that the present embodiments are relevant to the detection and transmission of the health of any other type of machine, vehicle, or industrial system/machine. Thus, the embodiments of the present disclosure described herein may provide mechanical health data to identify trends in individual machines on various vehicles or machines. Further, the embodiments of the present disclosure may help to prevent expensive delays and cancellations. Manufacturers may also gain insight into mechanical health of a fleet of aircraft and any issues emerging in the field, as well as more detail about actual operation of the equipment in the field.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

Referring now to the appended drawings, FIG. 1 depicts a block diagram of a system 100 for monitoring the health of a rotating machine mounted within or on a vehicle, according to one or more embodiments. In general, system 100 comprises a plurality of vehicles, e.g., aircraft, 110, mobile computing devices 112, and a ground system 102 all disposed in communication with each other via a network 108, such as the Internet.

As shown in FIG. 1, ground system 102 may include a server system 104 and one or more databases 106. The server system 104 may include one or more processors configured to execute instructions for monitoring the health of a rotating machine, as further detailed below. The server system 104 may include an application program interface (API) server, web page servers, processing servers, analytics servers, or any other types of front-end or back-end servers. Ground system 102 may be connected to a network 108, such as a cloud-based network.

Figure 2B:
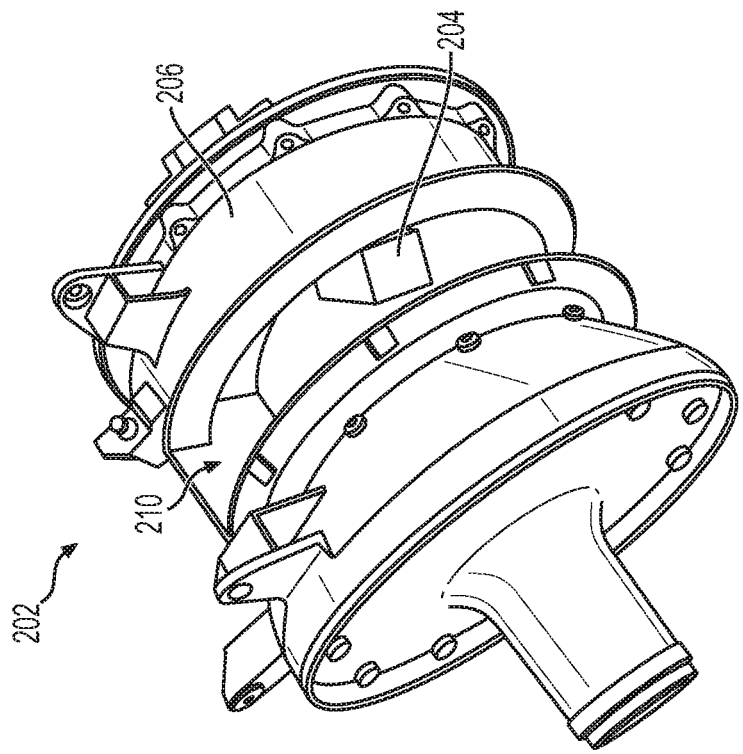
FIGS. 2A and 2B depict different views of a rotating machine having a vibration sensor coupled thereon isolated from a vehicle of the system of FIG. 1.
Figure 2A:
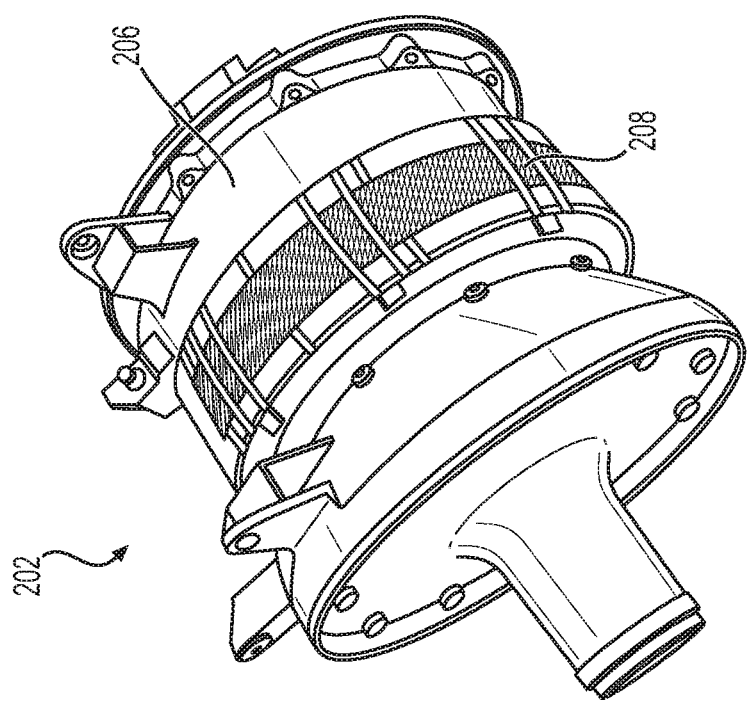

One or more vehicles 110, such as one or more aircraft, may connect to ground system 102 through network 108. Each vehicle 110 may have at least one rotating machine 202 (as shown in FIGS. 2A and 2B) mounted to or within the respective vehicle 110. For example, each aircraft 110 may include a rotating machine 202, such as a vacuum blower mounted in the aircraft 110 for use in a waste system of the aircraft 110, as further detailed below. Each vehicle 110 may further collect and send data to ground system 102 through network 108. In one embodiment, each vehicle 110 may send vibration data of a respective machine 202 (collected via a vibration sensor 204 as detailed below) to ground system 102 through network 108. For example, each vehicle 110 may include one or more receivers 111 onboard each respective vehicle 110. The one or more receivers 111 may be wired or wirelessly connected to one or more transceivers 113 onboard each respective aircraft 110. The one or more receivers 111 may receive the vibration data from each vibration sensor 204 and transmit the vibration data to ground system 102 through the one or more transceivers 113 via network 108. Ground system 102 (via server system 104) may receive the data from each aircraft 110 through network 108.

Figure 4B:
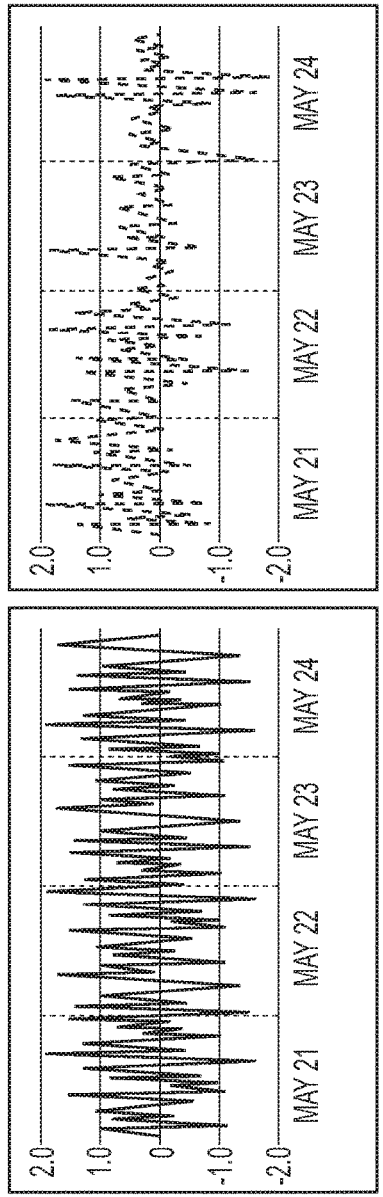
Figure 4B:
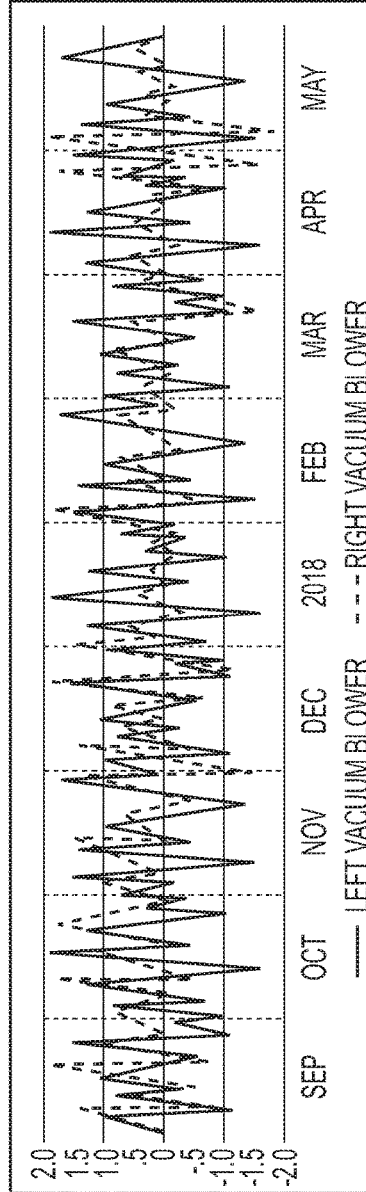

Ground system 102 may further process and perform analytics on the data to generate one or more health reports 402 for the rotating machine 202 of each aircraft 110 for transmission to and display on the one or more mobile computing device 112, to convey, as further detailed below. The health reports 402 may be accessed by users via a web portal 400 through network 108 (as shown in FIGS. 4A and 4B).

FIGS. 2A and 2B depict different views of a rotating machine 202 having a vibration sensor 204 (FIG. 2B) coupled thereon isolated from a vehicle 110 of system 100. In the exemplary embodiment, rotating machine 202 may be a vacuum blower for a waste system of a vehicle 110, such as an aircraft. Rotating machine 202 may include a housing 206 for housing components (including one or more rotating members) of rotating machine 202, such as a motor, a fan, bearings, or any other component of rotating machine 202. Rotating machine 202 may further include a replaceable filter 208 around the housing 206 to cover an inlet 210 (FIG. 2B) of rotating machine 202. Inlet 210 of rotating machine 202 may include a space within housing 206. Vibration sensor 204 may be mounted within the inlet 210 space of housing 206, such that vibration sensor 204 is integral with rotating machine 202. For example, vibration sensor 204 may be coupled to housing 206 by fastening means (not shown), adhesive (e.g., glue, paste, epoxy, etc.), clips, clamps, welding, brazing, cement, or the like. Fastening means may be, for example, nut and bolts, screws, pins, or the like. It is understood that vibration sensor 204 may be located anywhere on or within housing 206 of rotating machine 202 and may be coupled to rotating machine 202 by any coupling means known in the art.

The vibration sensor 204 may measure and collect vibration data of the rotating machine 202 during operation of the rotating machine 202. In one embodiment, vibration sensor 204 may be powered by input power of the rotating machine 202. For example, vibration sensor 204 may be electrically connected to the input power of rotating machine 202 or may be galvanically isolated via current transformers (not shown). In one embodiment, vibration sensor 204 may be powered by vibrations of rotating machine 202, such as by a piezoelectric device. Vibration sensor 204 may store power via a battery. In one embodiment, vibration sensor 204 may turn on (e.g., wake up) when vibration frequency of the rotating machine 202 reaches a predetermined threshold.

Vibration sensor 204 may send vibration data of rotating machine 202 to the one or more receivers 111 onboard the vehicle 110. For example, vibration sensor 204 may be in communication with the one or more receivers 111 via Bluetooth®, Wi-Fi, radio, cellular, infrared, or any other type of wireless or wired communication known in the art. The one or more receivers 111 may then send the vibration data to server system 104 through the one or more transceivers 113 onboard vehicle 110 via network 108. In one embodiment, the vibration sensor 204 may be wirelessly connected to network 108 (e.g., via Wi-Fi, radio, cellular, or the like). As such, server system 104 may receive the vibration data directly from the vibration sensor 204 through network 108. Server system 104 may generate a health report 402 for each rotating machine 202 based on the received vibration data, as further detailed below.

In one embodiment, server system 104 may generate an alert if the received vibration data exceeds a predetermined threshold value of known vibration data for the rotating machine 202. For example, server system 104 may compare the received vibration data with known vibration data for a respective rotating machine 202 and generate an alert if the received vibration data exceeds a predetermined threshold value of the known vibration data. The known vibration data may be collected during trial tests of rotating machine 202 prior to rotating machine 202 being installed on a respective vehicle 110. For example, technicians may perform trial tests on rotating machine 202 to pre-measure vibration frequency data of rotating machine 202. Server system 104 may receive the pre-measured vibration frequency data. Server system 104 may correlate peaks of the pre-measured vibration frequency data for the rotating machine 202 to determine the vibration values that correspond to a failure condition of rotating machine 202. For example, the peaks of the pre-measured vibration frequency data may correspond to failure conditions such as clogs, leaks, or damage to certain components (e.g., fans, bearings, etc.) of rotating machine 202. Server system 104 may store the determined vibration values for the threshold value in one or more databases 106 as the predetermined threshold value of the known vibration data for a respective rotating machine 202. Thus, server system 104 may determine if the received vibration data (e.g., measured during operation of rotating machine 202 on vehicle 110) exceeds the threshold value of the known vibration data. In one embodiment, vibration spectra measured by the vibration sensor 204 during a trial test may be compared to spectra of background vibration collected during operation of vehicle 110 (e.g., during a flight). Thus, server system 104 may account for additional vibration data from vehicle 110 while vehicle 110 is operating such that the correlated peaks in frequency ranges of interest may relate to possible failure modes of rotating machine 202.

In one embodiment, the determined vibration values for the threshold value may indicate impending failure of a specific component of rotating machine 202 (e.g., a fan, a bearing, etc.). For example, the predetermined threshold value of known vibration data may include a plurality of threshold values. Each of the plurality of threshold values may correspond to a failure mode of a different component of rotating machine 202. As such, server system 104 may generate an alert to indicate a respective component of rotating machine 202 is failing if the received vibration data exceeds a respective threshold value corresponding to that component.

In one embodiment, server system 104 may provide a recommended corrective action to the user via web portal 400, an application on mobile computing device 112, email, text, or the like. Based on the comparison of the received vibration data to the known vibration data, server system 104 may indicate a corrective action to mitigate the failure of rotating machine 202. For example, server system 104 may determine that rotating machine 202 and/or a component of the rotating machine 202 may need to be replaced based on the received vibration data and send a notification and/or alert to the user via web portal 400, the application, an email, or a text. The notification and/or alert may indicate that rotating machine 202 and/or the component should be replaced. For example, server system 104 may determine that there is a clog in the rotating machine 202 (e.g., in the vacuum blower) based on the received vibration data and notify the user of the clog.

Figure 3:
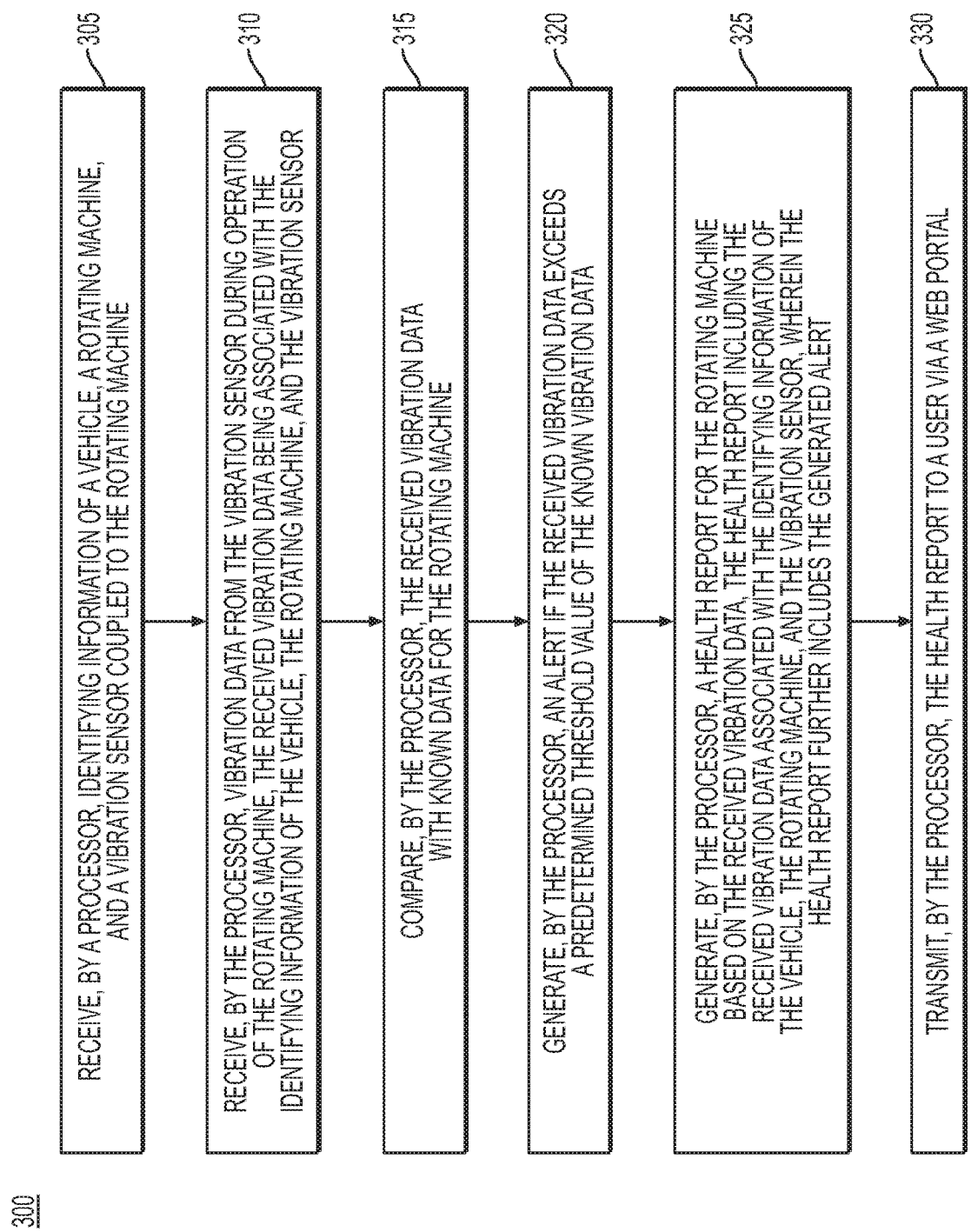
FIG. 3 depicts a flowchart of a method for monitoring the health of a rotating machine mounted on a vehicle of the system of FIG. 1.

FIG. 3 depicts a flowchart of a method 300 for monitoring the health of a rotating machine 202 mounted on a vehicle 110. In an initial step 305, a processor of server system 104 may receive identifying information of the vehicle 110, the rotating machine 202, and a vibration sensor 204 coupled to the rotating machine 202. In one embodiment, the processor may receive the identifying information when the rotating machine 202 is installed on the vehicle 110. For example, a user, such as a technician, may input information into web portal 400 of the identifying information of the vehicle 110, the rotating machine 202, and the vibration sensor 204. The identifying information of the vehicle may include, for example, a tail number, a license plate number, a serial number, a registration number, or the like. The identifying information of the rotating machine 202 may include, for example, an identification number, a serial number, a registration number, a name, or the like. The identifying information of the vibration sensor 204 may include, for example, a name of the sensor (e.g., Sensor1a), an identification number, a serial number, a registration number, or the like.

In step 310, the processor may receive vibration data from the vibration sensor 204 during operation of the rotating machine 202, the received vibration data being associated with the identifying information of the vehicle 110, the rotating machine 202, and the vibration sensor 204. In one embodiment, the processor may receive the vibration data from one or more receivers 111 onboard the vehicle in communication with the vibration sensor during operation of the rotating machine. For example, the vibration sensor 204 may be in communication with the one or more receivers 111 such that vibration sensor 204 may transmit the vibration data to the one or more receivers 111. The one or more receivers 111 may collect and transmit the vibration data from the vibration sensor 202 to the processor of the server system 104.

In step 315, the processor may compare the received vibration data with known vibration data for the rotating machine 202. In one embodiment, the processor of server system 104 may generate the known vibration data by pre-measured vibration data for the rotating machine during one or more trial tests of the rotating machine prior to the rotating machine being mounted on the vehicle.

In step 320, the processor may generate an alert if the received vibration data exceeds a predetermined threshold value of the known vibration data by a predetermined threshold value. In one embodiment, the processor of server system 104 may determine the predetermined threshold value of the known vibration data for the rotating machine by correlating peaks of the pre-measured vibration data to failure conditions of the rotating machine. In one embodiment, the predetermined threshold value of known vibration data may include a plurality of predetermined threshold values each corresponding to a failure condition of a different component of the rotating machine.

In step 325, the processor may generate a health report for the rotating machine 202 based on the received vibration data. The health report may include the received vibration data associated with the identifying information of the vehicle 110, the rotating machine 202, and the vibration sensor 204. The health report may further include the generated alert. In one embodiment, the processor may generate one or more alerts if the received vibration data exceeds one or more the plurality of predetermined threshold values of the known vibration data. The one or more generated alerts may each indicate a respective component of the rotating machine is failing. In one embodiment, the processor may determine a suggested corrective action for the user based on the comparing of the received vibration data with the known vibration data and transmit the suggested corrective action to the user. In one embodiment, the processor may generate one or more graphical representations of the received vibration data and the one or more graphical representations of the received vibration data may be included in the generated health report.

In step 330, the processor may transmit the health report to a user via a web portal. In one embodiment, the processor may transmit the health report to the user via email, text, or through the application on the mobile computing device 112.

FIGS. 4A and 4B depict an exemplary web portal 400 for displaying a health report of the rotating machine 202. As shown in FIG. 4A, web portal 400 may include a general health report 402a showing a drill-down dashboard of each vehicle 110 that has been tested. For example, the general health report 402a may include a vehicle type selector bar 404 for selecting a type of vehicle 110 to be displayed. The vehicle type may be, for example, type of aircraft, type of car, type of boat, type of spacecraft, etc. In the exemplary embodiment, the vehicle type selector bar 404 includes three different types of vehicles 110 (e.g., vehicle 1, vehicle 2, and vehicle 3). The general health report 402a may further include a table 406 for displaying status information for each rotating machine 202 that has been tested for a selected vehicle type. For example, table 406 may display the time and date of the test, the identifying information of the vehicle 110, the vibration sensor 204, and the rotating machine 202, and an average value of vibration for each rotating machine 202 measured during the test for each associated vibration sensor 204. In the exemplary embodiment, table 406 may display a tail number for each type of aircraft that has been tested, the sensor ID associated with each respective test, and the average vibration value for each rotating machine 202 on which the test was administered. General health report 402a may further include a view full report button 408 for displaying a detailed health report 402b for a respective vehicle 110. For example, when a user selects the view full report button 408 for a respective vehicle 110, web portal 400 may display the detailed health report 402b.

As shown in FIG. 4B, the detailed health report 402b may display general information 410 from the general health report 402a for the respective vehicle 110 (e.g., the time and date of the test, the identifying information of the vehicle 110, the vibration sensor 204, and the rotating machine 202 and the average value of vibration data for the test). The detailed health report 402b may further include one or more graphical representations 412 of the vibration data for each of the rotating machines 202 of the test. For example, the one or more graphical representations 412 may plot the vibration data in an acceleration (g) versus time (s) graph. However, it is understood that any type of graphical representation (e.g., frequency (kHz) vs. time (s), etc.) or general representation (e.g., charts, tables, etc.) of the vibration data may be utilized for displaying the vibration data for each rotating machine 202. The one or more graphical representations 412 may include vibration data measured for various tests including the most recent test. Detailed health report 402b may also include a graphical representation 414 of vibration data over a period of months. In the exemplary embodiment, when the rotating machine 202 includes a left vacuum blower and a right vacuum blower, the graphical representation 414 may combine the vibration data of the left vacuum blower and the right vacuum blower into a single graph.

In one embodiment, the health report 402 (e.g., the general health report 402a and/or the detailed health report 402b) may include a generated alert indicating failure of rotating machine 202, as detailed above. The generated alert may be displayed on the general health report 402a and/or the detailed health report 402b or may be sent to user via email, text, or push notification. The generated alert may include a color indicator for indicating a health of rotating machine 202. For example, green may indicate the rotating machine 202 is healthy (e.g., the received vibration data does not exceed the predetermined threshold value of known vibration data for the rotating machine 202). Yellow may indicate the rotating machine 202 is approaching failure (e.g., the received vibration data is near or minimally exceeds the predetermined threshold value of known vibration data for the rotating machine 202). Red may indicate the rotating machine 202 is failing or has failed (e.g., the received vibration data exceeds or greatly exceeds the predetermined threshold value of known vibration data for the rotating machine 202). It is understood that the alert may be any type of alert for indicating the health of rotating machine 202 is failing or has failed, such as any color, symbol, text, number, or the like.

Figure 5:
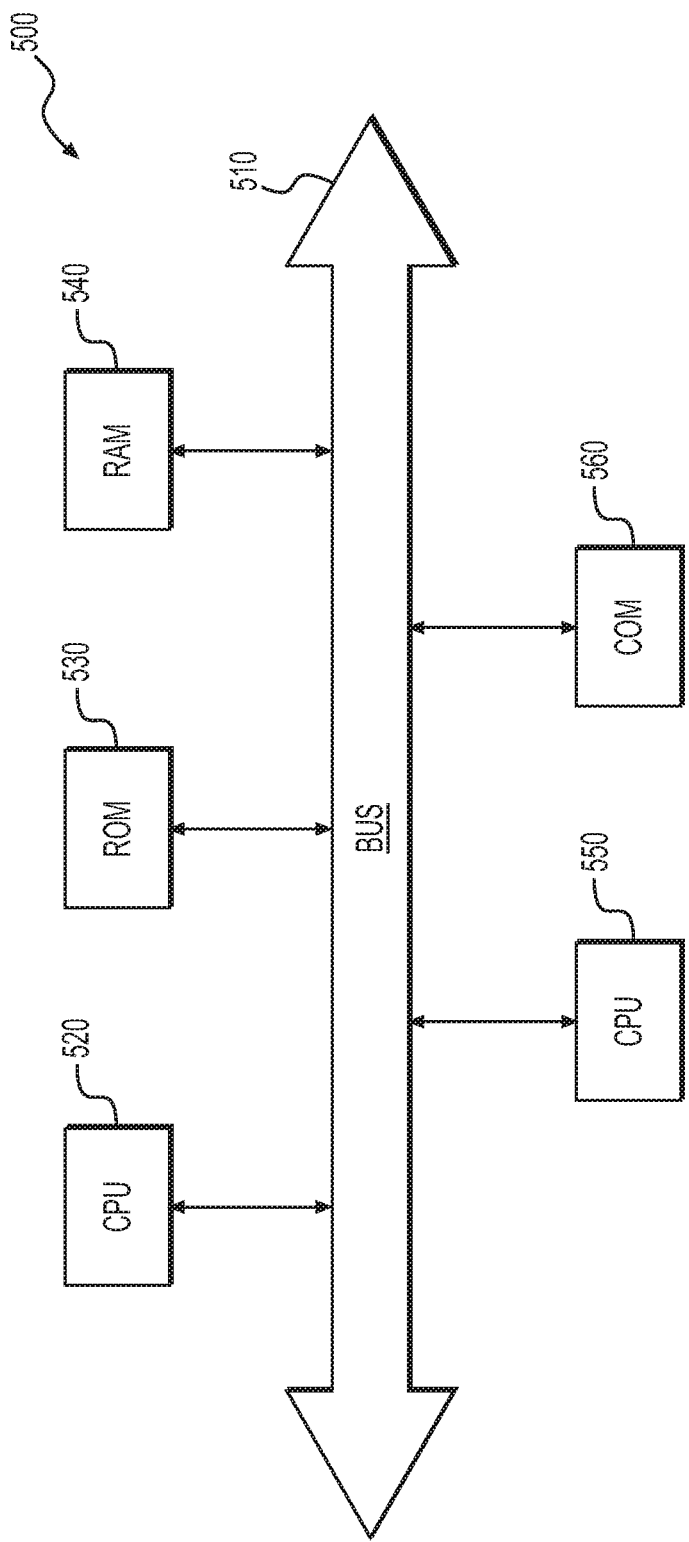
FIG. 5 depicts a high-level functional block diagram of an exemplary computer device or system, in which embodiments of the present disclosure, or portions thereof, may be implemented.

FIG. 5 depicts a high-level functional block diagram of an exemplary computer device or system, in which embodiments of the present disclosure, or portions thereof, may be implemented, e.g., as computer-readable code. For example, each of the exemplary systems, user interfaces and methods described above with respect to FIGS. 1-4B can be implemented in device 500 using hardware, software, firmware, tangible computer readable media having instructions stored thereon, or a combination thereof and may be implemented in one or more computer systems or other processing systems. Hardware, software, or any combination of such may implement each of the exemplary systems, user interfaces, and methods described above with respect to FIGS. 1-4B.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores."

Various embodiments of the present disclosure, as described above in the examples of FIGS. 1-4B may be implemented using device 500. After reading this description, it will become apparent to a person skilled in the relevant art how to implement embodiments of the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As shown in FIG. 5, device 500 may include a central processing unit (CPU) 520. CPU 520 may be any type of processor device including, for example, any type of special purpose or a general-purpose microprocessor device. As will be appreciated by persons skilled in the relevant art, CPU 520 also may be a single processor in a multi-core/multi-processor system, such system operating alone, or in a cluster of computing devices operating in a cluster or server farm. CPU 520 may be connected to a data communication infrastructure 410, for example, a bus, message queue, network, or multi-core message-passing scheme.

Device 500 may also include a main memory 540, for example, random access memory (RAM), and may also include a secondary memory 530. Secondary memory 530, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 530 may include other similar means for allowing computer programs or other instructions to be loaded into device 500. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 500.

Device 500 may also include a communications interface ("COM") 560. Communications interface 560 allows software and data to be transferred between device 500 and external devices. Communications interface 560 may include a modem, a network interface (such as an Ethernet card), a communications port, a PCMCIA slot and card, or the like. Software and data transferred via communications interface 560 may be in the form of signals, which may be electronic, electromagnetic, optical, or other signals capable of being received by communications interface 560. These signals may be provided to communications interface 560 via a communications path of device 500, which may be implemented using, for example, wire or cable, fiber optics, a phone line, a cellular phone link, an RF link or other communications channels.

The hardware elements, operating systems and programming languages of such equipment are conventional in nature, and it is presumed that those skilled in the art are adequately familiar therewith. Device 500 also may include input and output ports 550 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for monitoring the health of a rotating machine mounted on a vehicle, the method comprising:
   receiving, by a processor, identifying information of the vehicle, the rotating machine, and a vibration sensor, wherein the vibration sensor is coupled to the rotating machine such that the vibration sensor is integral with the rotating machine and located in an inlet space of the rotating machine underneath a replaceable filter;
   receiving, by the processor, vibration data from the vibration sensor during operation of the rotating machine, the received vibration data being associated with the identifying information of the vehicle, the rotating machine, and the vibration sensor;
   comparing, by the processor, the received vibration data with known vibration data for the rotating machine;
   generating, by the processor, an alert if the received vibration data exceeds a predetermined threshold value of the known vibration data, wherein the predetermined threshold value of the known vibration data includes a plurality of predetermined threshold values each corresponding to a failure condition of a different component of the rotating machine;
   generating, by the processor, a health report for the rotating machine based on the received vibration data, the health report including the received vibration data associated with the identifying information of the vehicle, the rotating machine, and the vibration sensor, wherein the health report further includes the generated alert; and
   transmitting, by the processor, the health report to a user via a web portal.

2. The method of claim 1, wherein the receiving, by the processor, the vibration data from the vibration sensor during operation of the rotating machine includes:
   receiving, by the processor, vibration data from one or more receivers onboard the vehicle in communication with the vibration sensor during operation of the rotating machine.

3. The method of claim 1, further comprising:
   determining, by the processor, the predetermined threshold value of the known vibration data for the rotating machine by correlating peaks of pre-measured vibration data for the rotating machine to failure conditions of the rotating machine,
   wherein the pre-measured vibration data for the rotating machine is measured during one or more trial tests of the rotating machine to generate the known vibration data for the rotating machine prior the rotating machine being mounted on the vehicle.

4. The method of claim 1, wherein the generating, by the processor, the alert if the received vibration data exceeds the predetermined threshold value of the known vibration data includes:
   generating, by the processor, one or more alerts if the received vibration data exceeds one or more of the plurality of predetermined threshold values of the known vibration data,
   wherein the one or more alerts each indicate a respective component of the rotating machine is failing.

5. The method of claim 1, further comprising:
   determining, by the processor, a suggested corrective action for the user based on the comparing of the received vibration data with the known vibration data; and
   transmitting, by the processor, the suggested corrective action to the user.

6. The method of claim 1, wherein the generated health report includes one or more graphical representations of the received vibration data.

7. The method of claim 1, wherein the vibration sensor is coupled to the rotating machine by at least one of fastening means or adhesive.

8. The method of claim 1, wherein the vehicle is an aircraft and the rotating machine is a vacuum blower of a waste system onboard the aircraft.

9. A system for monitoring the health of a rotating machine mounted on a vehicle, the system comprising:
   a memory having processor-readable instructions therein; and
   at least one processor configured to access the memory and execute the processor-readable instructions, which when executed by the processor configures the processor to perform a plurality of functions, including functions for:
   receiving, by the processor, identifying information of the vehicle, the rotating machine, and a vibration sensor, wherein the vibration sensor is coupled to the rotating machine such that the vibration sensor is integral with the rotating machine and located in an inlet space of the rotating machine underneath a replaceable filter;
   receiving, by the processor, vibration data from the vibration sensor during operation of the rotating machine, the received vibration data being associated with the identifying information of the vehicle, the rotating machine, and the vibration sensor;
   comparing, by the processor, the received vibration data with known vibration data for the rotating machine;
   generating, by the processor, an alert if the received vibration data exceeds a predetermined threshold value of the known vibration data, wherein the predetermined threshold value of the known vibration data includes a plurality of predetermined threshold values each corresponding to a failure condition of a different component of the rotating machine;
   generating, by the processor, a health report for the rotating machine based on the received vibration data, the health report including the received vibration data associated with the identifying information of the vehicle, the rotating machine, and the vibration sensor, wherein the health report further includes the generated alert; and
   transmitting, by the processor, the health report to a user via a web portal.

10. The system of claim 9, wherein the receiving, by the processor, the vibration data from the vibration sensor during operation of the rotating machine includes:
   receiving, by the processor, vibration data from one or more receivers onboard the vehicle in communication with the vibration sensor during operation of the rotating machine.

11. The system of claim 9, wherein the plurality of functions further include functions for:
   determining, by the processor, the predetermined threshold value of the known vibration data for the rotating machine by correlating peaks of pre-measured vibration data for the rotating machine to failure conditions of the rotating machine,
   wherein the pre-measured vibration data for the rotating machine is measured during one or more trial tests of the rotating machine to generate the known vibration data for the rotating machine prior the rotating machine being mounted on the vehicle.

12. The system of claim 9, wherein the generating, by the processor, the alert if the received vibration data exceeds the predetermined threshold value of the known vibration data includes:
   generating, by the processor, one or more alerts if the received vibration data exceeds one or more of the plurality of predetermined threshold values of the known vibration data,
   wherein the one or more alerts each indicate a respective component of the rotating machine is failing.

13. The system of claim 9, wherein the plurality of functions further include functions for:
   determining, by the processor, a suggested corrective action for the user based on the comparing of the received vibration data with the known vibration data; and
   transmitting, by the processor, the suggested corrective action to the user.

14. The system of claim 9, wherein the generated health report includes one or more graphical representations of the received vibration data.

15. The system of claim 9, wherein the vibration sensor is coupled to the rotating machine by at least one of fastening means or adhesive.

16. A non-transitory computer-readable medium containing instructions for monitoring the health of a rotating machine mounted on a vehicle, comprising:
   receiving, by a processor, identifying information of the vehicle, the rotating machine, and a vibration sensor, wherein the vibration sensor is coupled to the rotating machine such that the vibration sensor is integral with the rotating machine and located in an inlet space of the rotating machine underneath a replaceable filter;
   receiving, by the processor, vibration data from the vibration sensor during operation of the rotating machine, the received vibration data being associated with the identifying information of the vehicle, the rotating machine, and the vibration sensor;
   comparing, by the processor, the received vibration data with known vibration data for the rotating machine;
   generating, by the processor, an alert if the received vibration data exceeds a predetermined threshold value of the known vibration data, wherein the predetermined threshold value of the known vibration data includes a plurality of predetermined threshold values each corresponding to a failure condition of a different component of the rotating machine;
   generating, by the processor, a health report for the rotating machine based on the received vibration data, the health report including the received vibration data associated with the identifying information of the vehicle, the rotating machine, and the vibration sensor, wherein the health report further includes the generated alert; and
   transmitting, by the processor, the health report to a user via a web portal.

17. The non-transitory computer-readable medium of claim 16, wherein the receiving, by the processor, the vibration data from the vibration sensor during operation of the rotating machine includes:
  receiving, by the processor, vibration data from one or more receivers onboard the vehicle in communication with the vibration sensor during operation of the rotating machine.

18. The non-transitory computer-readable medium of claim 16, further comprising:
  determining, by the processor, the predetermined threshold value of the known vibration data for the rotating machine by correlating peaks of pre-measured vibration data for the rotating machine to failure conditions of the rotating machine,
  wherein the pre-measured vibration data for the rotating machine is measured during one or more trial tests of the rotating machine to generate the known vibration data for the rotating machine prior the rotating machine being mounted on the vehicle.

19. The non-transitory computer-readable medium of claim 16, wherein the generating, by the processor, the alert if the received vibration data exceeds the predetermined threshold value of the known vibration data includes:
  generating, by the processor, one or more alerts if the received vibration data exceeds one or more of the plurality of predetermined threshold values of the known vibration data,
  wherein the one or more alerts each indicate a respective component of the rotating machine is failing.

20. The non-transitory computer-readable medium of claim 16, further comprising:
  determining, by the processor, a suggested corrective action for the user based on the comparing of the received vibration data with the known vibration data; and
  transmitting, by the processor, the suggested corrective action to the user.

* * * * *

UNITED STATES PATENT AND TRADEMARK OFFICE
CERTIFICATE OF CORRECTION

Page 1 of 1

PATENT NO. : 11,225,334 B2
APPLICATION NO. : 16/375080
DATED : January 18, 2022
INVENTOR(S) : Clampitt, III et al.

It is certified that error appears in the above-identified patent and that said Letters Patent is hereby corrected as shown below:

On the Title Page

Item (71), Line 1, "Honeywell international inc.," should read "Honeywell International Inc.,"

Item (56), under Other Publications Column 2, Line 1, "Prateek Saxena et at" should read "Prateek Saxena et al."

Signed and Sealed this
First Day of March, 2022

Drew Hirshfeld
*Performing the Functions and Duties of the
Under Secretary of Commerce for Intellectual Property and
Director of the United States Patent and Trademark Office*